United States Patent [19]
Burkett

[11] Patent Number: 5,866,185
[45] Date of Patent: Feb. 2, 1999

[54] METHOD AND DEVICE FOR DISPENSING AN INGESTIBLE SOLUBLE MATERIAL FOR FURTHER DISSOLVING IN A LIQUID

[76] Inventor: Edward K. Burkett, 5109 Goldsboro Dr., Apt. 2F, Newport News, Va. 23605

[21] Appl. No.: 898,036

[22] Filed: Jul. 22, 1997

[51] Int. Cl.⁶ ..................................................... A47J 31/00
[52] U.S. Cl. .............................. 476/425; 426/77; 426/89; 426/103; 426/82; 206/0.5; 99/295; 99/323; 222/188
[58] Field of Search .................................. 426/77, 78, 85, 426/89, 104, 82, 103, 425; 99/323, 295; 206/0.5; 222/188

[56] References Cited

U.S. PATENT DOCUMENTS

| | | | |
|---|---|---|---|
| 325,711 | 9/1885 | Stuckers, Jr. | 426/138 |
| 1,576,735 | 3/1926 | Fessenden | 426/77 |
| 2,330,884 | 10/1943 | Harriman | 426/78 |
| 3,102,465 | 9/1963 | Montesano | 99/323 |
| 3,275,448 | 9/1966 | Sommer | 426/115 |
| 4,338,338 | 7/1982 | Popkes | 426/82 |
| 4,717,016 | 1/1988 | Dalgleish | 206/0.5 |
| 4,860,929 | 8/1989 | Lowe et al. | 222/189 |
| 4,921,713 | 5/1990 | Fowler | 462/85 |
| 4,986,451 | 1/1991 | Lowe et al. | 222/189 |
| 5,047,252 | 9/1991 | Liu et al. | 426/79 |
| 5,076,425 | 12/1991 | Plone | 206/220 |
| 5,440,976 | 8/1995 | Giuliano et al. | 99/485 |

*Primary Examiner*—Milton Cano
*Attorney, Agent, or Firm*—William L. Muckelroy, Esq.; Gary N. Lipson, Esq.

[57] ABSTRACT

A dispensing device for a soluble or dispersible material which comprises a tube formed of a liquid impermeable material and of unitary construction, the tube being closed at both ends and having perforations along a portion of its length or close to one end, and containing a soluble granular material. The device is coated with a material such as sugar or "NUTRA SWEET", the material being rigid in the dry state and soluble when immersed in a liquid. The device is immersed in a liquid which results in a dissolving of material coating permitting the material within device to also disperse into the liquid.

15 Claims, 1 Drawing Sheet

FIG. 1
(PRIOR ART)
FIG. 2
FIG. 3
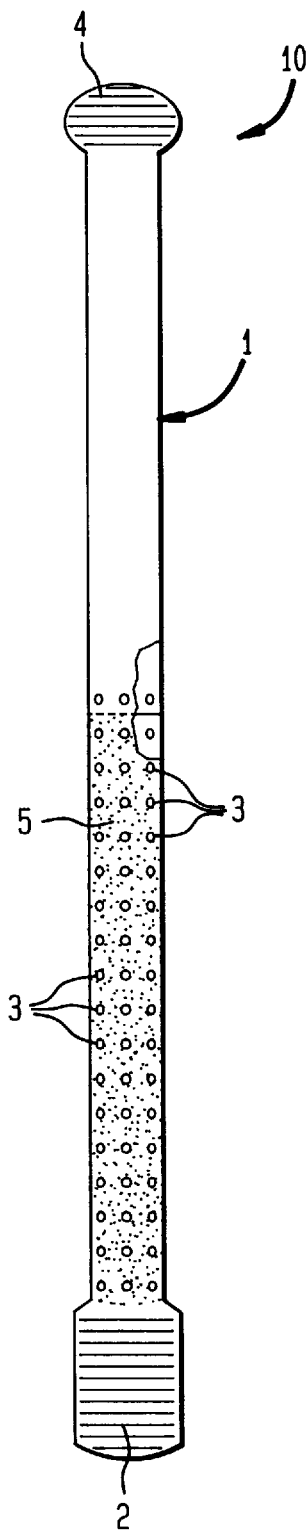
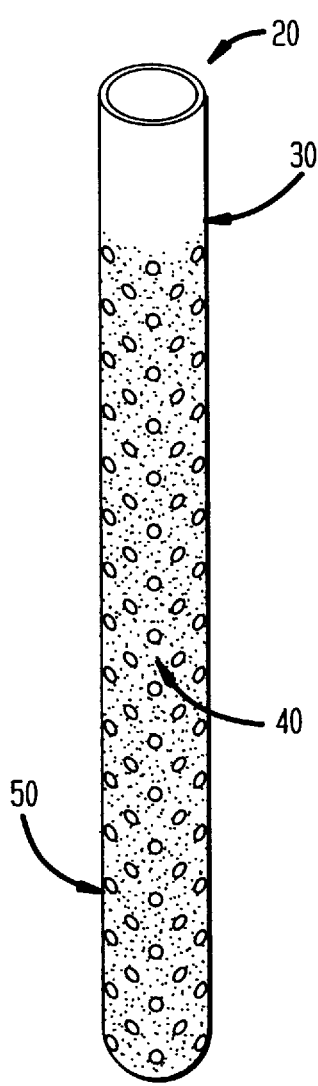
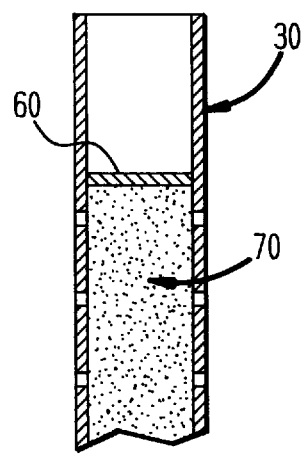

METHOD AND DEVICE FOR DISPENSING AN INGESTIBLE SOLUBLE MATERIAL FOR FURTHER DISSOLVING IN A LIQUID

BACKGROUND

This invention relates to a dispensing device for soluble or dispersible materials and, more particularly, relates to such a device in the form of an elongated tube of unitary construction sealed at both ends.

Preparing a drink from a mix can be a time consuming and messy process. One must search through a cabinet or drawer for the drink mix container, open the container and scoop or pour out the mix into a pitcher. Water, sugar, and ice are then added to the mix which is stirred to dissolve the mix in the water. After this process the mixture can be poured into individual glasses. This is a lengthy and inconvenient process, especially when small children are waiting for their drinks.

U.S. Pat. No. 3,102,465, issued to Montesano in 1963, discloses a packaging, infusion unit which compresses two parts, one being a sheath element permanently closed at one end and accommodation, via its other end, a foraminate charge-holding element. The latter may be completely retracted into the sheath element, and the device in this configuration may be sealed by a closure cap. Devices of this type are relatively complicated to fabricate and have not found acceptance in the market place.

U.S. Pat. No. 4,860,929 discloses a dispensing device for soluble granular material. The device comprises a tube containing a solid granular material. The tube being closed at both ends and having perforations along a portion of its length and having a paddle formed at one end. In this design and in the dry state, the granular material must be sized so as not to escape through the perforations while the granular material is in a dry state.

U.S. Pat. No. 4,717,016 discloses a packaging device for ingredients which comprises a resilient tube having apertures provided therein. The apertures are opened by applying longitudinal stress to the resilient tube thus releasing the ingredients contained therein.

U.S. Pat. No. 4,076,425 discloses a dispensing device, a lid, and a container. The dispensing device is tubular and formed of a porous material. A material is contained within the tube and is dispersed when placed in contact with a liquid. In addition, the dispensing device may contain other material such as cream which may also be introduced into the liquid.

U.S. Pat. No. 5,440,976 discloses a device for dispensing natural and artificial sweeteners into a beverage. The device comprises a tube having perforations and at least one separator disk positioned therein, and a solid sleeve formed to receive the tube. The tube is in the sleeve such that the tube may be urged forward dispensing a measured amount of sweetener into the beverage.

SUMMARY

An object of the present invention is to provide a tubular dispensing device having perforations therein, that is similar to the device as provided in U.S. Pat. Nos. 4,860,929 and 4,986,451.

According to one aspect of the present invention, the invention includes a tubular dispensing device having perforations therein. The device comprises a tube formed of a liquid-impermeable material of unitary construction and the tubular portion further contains a soluble or dispersible material. The device is improved by including a soluble coating formed on the outer surface of the tubular portion. The soluble coating may be formed from a material such as sugar, which is characterized by forming a solid coating in a dry state and dissolving when the coating comes into contact with a liquid. The coating material covers the perforations in the dry state which keeps the material contained, and the coating material dissolves when in a wet state permitting any material contained in the tubular portion to dissolve into the surrounding liquid.

The diameter of the perforations is selected to control the rate that the soluble material is dispersed in the liquid. Since the perforations are closed when the coating material is in the dry state, it is no longer necessary as in the prior art, to ensure that the diameter of the perforations is small enough to keep the soluble material within the tubular portion when the soluble material is in the dry state.

It is contemplated that one method of practicing the present invention includes the steps of: filling a container with water, inserting some portion of the present invention into the container, and stirring the present invention. Submerging the present invention in liquid causes the coating to dissolve thus permitting the water to flow through the perforations and thus dissolving the material contained therein.

BRIEF DESCRIPTION OF THE DRAWINGS

For a better understanding of the invention, and to show how the same may be carried into effect, reference will now be made, by way of example, to the accompanying drawings, in which:

FIG. 1 illustrates a perspective view of a prior art dispensing device;

FIG. 2 illustrates a perspective view of the present invention; and

FIG. 3 illustrates a cross section view of the top portion of the invention as shown in FIG. 2.

DETAILED DESCRIPTION

FIG. 1 is a perspective of the prior art referred to generally as numeral 10. The prior art invention comprises a plastic straw 1 sealed at its bottom end 2 by a hot clamping device and having, adjacent to the sealed end 2, a series of perforations 3. These perforations 3 extend approximately halfway along the length of the straw 1. The sealed end 2 of the device 10 is flattened and constitutes a paddle which assists in stirring a beverage (not shown) with which the device 10 is used. The upper end 4 of the straw is also heat-sealed. A fine granular material is encapsulated within the straw.

Referring to FIG. 2, the present invention is referred to generally by numeral 20. It is contemplated that the present invention 20 could be made available in a variety of lengths and diameters. The exact dimensions of the tubular portion 30 could be adjusted for the number of people being served and the characteristics of the material that is to be contained within tubular portion 30. The perforations 40 are of sufficient diameter to permit an intended liquid to flow freely through the tubular device. The dimension of the perforations 40 is influenced by the desired rate of dispersion of the enclosed material and not by the granular size of the material. A coating 50 is formed on the outside surface of the tubular portion 30. The coating 50 is formed from a substance that is characterized by forming a layer that is solid in the dry state and capable of being dissolved when immersed in liquid. The coating 50 may be applied to the tubular portion 30 prior to the time that material is placed within the tubular portion 30. If sugar or an artificial sweetener such as "NUTRA SWEET" is used as the coating 50, it may be applied to the outer surface of the tubular portion 30 by a process of dipping the tubular device in a sugar solution and letting the tubular portion 30 dry. This process can be continued until the coating 50 effectively covers the perforations 40. Coating the tubular portion 30 first, facilitates filling the tubular device by avoiding a loss of material through the perforations 40 and avoiding contamination of the material by foreign elements.

FIG. 3 depicts a cross section view of the embodiment of the invention as shown in FIG. 2. A horizontal barrier 60 is provided at or near the top portion of the tubular portion 30. The horizontal barrier 60 is heat sealed to prevent the material 70 contained in the tubular portion 30 from leaking out. The material 70 may be comprised of a variety of substances that are soluble in liquid. In this embodiment, it is contemplated that the material is comprised of a powdered drink mix including, but not limited to, such flavors as cherry, orange, grape, and fruit punch. In this embodiment, the horizontal barrier is positioned approximately one inch from the top of the tubular portion 30.

I claim:

1. A device for dispensing a dry soluble material for further dissolving in a selected ingestible liquid, the device comprising:
   a liquid-impermeable plastic tube having an outer surface, upper and lower sealed ends and an integral transverse plastic liquid-impermeable barrier in-between the upper and lower sealed ends, the tube being of a unitary construction;
   an ingestible dry soluble granular material between the barrier and the lower sealed end;
   perforations along a lower portion of the tube, each of the perforations being larger than each of the ingestible granules; and
   a soluble sealing coating on the outer surface of the tube, the soluble sealing coating covering and sealing the perforations such that the perforations are temporarily sealed;
   whereby the soluble granules are temporarily retained within the tube until the coating is dissolved in the ingestible liquid and upon dissolving of the coating, allowing the soluble granular material to dissolve as the liquid passes through the perforations.

2. A device as claimed in claim 1, wherein the temporarily sealed perforations are sized to permit the free flow of a liquid when unsealed.

3. A device as claimed in claim 2, wherein the granular material is comprised of granules of a size that is smaller than the size of the unsealed perforations.

4. A device as claimed in 2, wherein the liquid is water; and the granular material is a drink mix.

5. A device as claimed in claim 1, wherein the coating is comprised of a coating material, the coating material being solid when in a dry state and being soluble when immersed in a liquid, the material substantially sealing and covering the perforations whereby each of the perforations is temporarily substantially eliminated.

6. A device as claimed in claim 1, wherein the tube has a first end and a second end, the second end being permanently closed and the first end of the tube is closed by means of a horizontally oriented plastic liquid-impermeable barrier.

7. A device as claimed in claim 6, wherein the tube is formed such that the first end defines an opening, and the first end being closed by means of a heat seal positioned in the opening.

8. A device as claimed in claim 1, wherein the coating material is a dry sugar solution.

9. A device as claimed in claim 1, wherein the coating material is an artificial sweetener.

10. A method of dispensing an ingestible soluble granular material for further dissolving in a liquid comprising the steps of:
    immersing the dispensing device in a liquid, the dispensing device comprising:
       a liquid-impermeable plastic tube having an outer surface, upper and lower sealed ends and an integral transverse plastic liquid-impermeable barrier in-between the upper and lower sealed ends, the tube being of a unitary construction;
       an ingestible dry soluble granular material between the barrier and the lower sealed end;
       perforations along a lower portion of the tube, each of the perforations being larger than each of the ingestible granules; and
       a soluble sealing coating on the outer surface of the tube, the soluble sealing coating covering and sealing the perforations such that the perforations are temporarily sealed;
       whereby the soluble granules are temporarily retained within the tube until the coating is dissolved in the ingestible liquid and upon dissolving of the coating, allowing the soluble granular material to dissolve as the liquid passes through the perforations;
    dissolving the soluble coating; and
    agitating the dispersing device in the liquid such that the soluble granular material in the dispensing device dissolves in the liquid.

11. A method as claimed in claim 10, wherein the material is a drink mix.

12. A method as claimed in claim 10, wherein the coating is sugar.

13. In a sealed straw-shaped device for dispensing a dry soluble powdered drink mix into a liquid in a container, the device comprising a plastic liquid-impermeable tube having an outer surface, upper and lower sealed ends and an integral transverse plastic liquid-impermeable barrier in-between the upper and lower sealed ends, the tube being of a unitary construction, an ingestible dry soluble granular material between the barrier and the lower sealed end, the lowered sealed end of the tube being flattened into a stirring paddle, and perforations along a lower portion of the tube sized to prevent the powdered drink mix from escaping the tube, the improvement comprises:
    perforations along a lower portion of the tube, each of the perforations being larger than each of the ingestible granules; and
    a soluble sealing coating on the outer surface of the tube, the soluble sealing coating covering and sealing the perforations such that the perforations are temporarily sealed;
    whereby the soluble granules are temporarily retained within the tube until the coating is dissolved in the liquid and upon dissolving of the coating, allowing the powdered drink mix to dissolve as the liquid passes through the perforations.

14. The device of claim 13 wherein the barrier means comprises an integral horizontally oriented member adapted to seal off the bottom portion of said device and further adapted to retain the granular material in said lower portion of the device.

15. A device for dispensing a dry soluble material for further dissolving in a selected ingestible liquid, the device comprising:

an elongated, vertically oriented, liquid impermeable plastic tube having an outer surface, upper and lower sealed ends and an integral transverse plastic liquid-impermeable barrier in-between the upper and lower sealed ends, the tube being of a unitary construction, the lower sealed end forming a stirring paddle;

a powdered drink mix between the barrier and the lower sealed end;

perforations along a lower portion of the tube, each of the perforations being larger than each of the ingestible granules; and a soluble sealing coating on the outer surface of the tube, the soluble sealing coating covering and sealing the perforations such that the perforations are temporarily sealed;

whereby the soluble granules are temporarily retained within the tube until the coating is dissolved in the ingestible liquid and upon dissolving of the coating, allowing the powdered drink mix to dissolve as the liquid passes through the perforations.

\* \* \* \* \*